US008214668B2

(12) United States Patent
Kajihara

(10) Patent No.: US 8,214,668 B2
(45) Date of Patent: Jul. 3, 2012

(54) SYNCHRONIZING CIRCUIT

(75) Inventor: Hirotsugu Kajihara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 412 days.

(21) Appl. No.: 12/630,028

(22) Filed: Dec. 3, 2009

(65) Prior Publication Data
US 2010/0169675 A1     Jul. 1, 2010

(30) Foreign Application Priority Data

Dec. 25, 2008  (JP) ................................. 2008-330837

(51) Int. Cl.
*G06F 1/00*     (2006.01)
*G06F 1/04*     (2006.01)
*G06F 1/12*     (2006.01)
*G06F 5/06*     (2006.01)

(52) U.S. Cl. ........ 713/300; 713/322; 713/500; 713/501; 713/600; 713/601

(58) Field of Classification Search .................. 713/300, 713/322, 500, 600, 601
See application file for complete search history.

(56) References Cited

U.S. PATENT DOCUMENTS

| | | | |
|---|---|---|---|
| 7,975,163 B1 * | 7/2011 | Swanson ...................... | 713/600 |
| 2003/0076909 A1 * | 4/2003 | Greenhill et al. ............. | 375/354 |
| 2007/0214437 A1 * | 9/2007 | Kajihara ........................... | 716/1 |
| 2009/0172458 A1 * | 7/2009 | Yamada et al. ................ | 713/600 |
| 2009/0259862 A1 * | 10/2009 | Bulusu et al. .................. | 713/322 |

FOREIGN PATENT DOCUMENTS

JP    2006-237189    9/2006

OTHER PUBLICATIONS

SpyGlass Clock-Reset Rules Reference, Version 3.9.2, Atrenta, Inc., Jan. 2009.

* cited by examiner

*Primary Examiner* — Thomas Lee
*Assistant Examiner* — Samantha Hoang
(74) *Attorney, Agent, or Firm* — Turocy & Watson, LLP

(57) ABSTRACT

A synchronizing circuit includes an internal partial power supply interruption circuit section which can be subjected to a power supply interruption and includes a data transmission register configured to output data for controlling a power supply interruption and a clock enable control register configured to output an enable signal; an internal partial power supply interruption control circuit section configured to control a power supply interruption and includes a gated clock buffer configured to control a clock signal based on the enable signal, and a data reception register configured to take in data based on the controlled clock signal; and an isolation cell configured to output an output from the internal partial power supply interruption circuit section as a fixed value when the internal partial power supply interruption circuit section has been subjected to a power supply interruption.

14 Claims, 13 Drawing Sheets

SYNCHRONIZING CIRCUIT

CROSS-REFERENCE TO RELATED APPLICATION

This application is based upon and claims the benefit of priority from the prior Japanese Patent Application No. 2008-330837 filed in Japan on Dec. 25, 2008, the entire contents of which are incorporated herein by reference.

BACKGROUND OF THE INVENTION

1. Field of the Invention

The present invention relates to a synchronizing circuit, and more particularly to a synchronizing circuit that can carry out reduced power consumption at a time of a power supply interruption.

2. Description of the Related Art

In recent years, increases in the scale and functionality of LSIs are proceeding accompanying the development of semiconductors. On the other hand, reductions in standby power are being sought for portable devices and sensor networks and the like. In a high function LSI, all of the functions are not in constant operation, and reduced power consumption can be realized by stopping the operations of circuit sections that are not operating. Although a gated clock method may be mentioned as a well known method, in recent years attention is being focused on internal partial power supply interruption technology that is more effective than the gated clock method.

The term "internal partial power supply interruption technology" refers to technology that stops a power supply of only one portion inside an LSI by inserting a switch or a regulator into a power line or a ground line of the LSI.

For example, a semiconductor integrated circuit device has been proposed that controls the supply or interruption of power with respect to a function block that is an internal partial power supply interruption circuit section (for example, see Japanese Patent Application Laid-Open Publication No. 2006-237189).

The semiconductor integrated circuit device proposed in the aforementioned publication includes a power control register configured to hold information that shows a power supply status of a function block, and has a power control circuit that controls the supply or interruption of power to a function block in accordance with information that is held in the power control register. For example, by providing the power control circuit with a timer function it is possible to "restore power minutes after power is interrupted".

In an LSI which adopts this type of internal partial power supply interruption technology, in some cases a path that becomes an asynchronous data path according to an asynchronous clock exists between internal partial power supply interruption circuit sections or between a constant power supply circuit section and an internal partial power supply interruption circuit section. With an asynchronous data path that straddles a boundary surface of an internal partial power supply interruption circuit, a problem may arise with regard to the circuit scale or power consumption that does not occur with an ordinary asynchronous data path. Specifically, the following situation may arise.

Because a power control circuit that is an internal partial power supply interruption control circuit section also performs restoration control from a state in which power of an internal partial power supply interruption circuit section has been interrupted, the power control circuit is a circuit that is constantly supplied with power. Therefore, in a case in which the power of an internal partial power supply interruption circuit section is interrupted, a standby power of the overall circuit is an operating power of the internal partial power supply interruption control circuit section. Hence, with an LSI that is used for a device in which standby power is important, such as a portable device or a sensor network, it is important to lower the operating power of the internal partial power supply interruption control circuit section.

Further, in order to perform power interruption/restoration control, the internal partial power supply interruption control circuit section exchanges control values or data with a processor via a bus and a bus interface or via an interrupt circuit. In a case in which the bus interface and the interrupt circuit are internal partial power supply interruption circuits, it is necessary to insert an isolation cell on a data path to the internal partial power supply interruption control circuit section. The isolation cell is configured by an AND gate or an OR gate, and the data path is fixed to "0" or "1" to prevent propagation of an undefined output when the power is interrupted.

Accordingly, there has been the problem that, with respect to the internal partial power supply interruption control circuit section, unintended updating of data is performed at the control register by the fixed value of "0" or "1". For example, a malfunction is caused by a control register that has been originally set to "1" being overwritten with "0" by propagation of a fixed value "0" when power is interrupted. When a countermeasure is implemented to prevent this kind of unintended updating of a control register, the circuit scale of the internal partial power supply interruption control circuit section increases.

Further, as described above, since the internal partial power supply interruption control circuit section is a circuit to which power is constantly supplied, it is desirable from the viewpoint of reducing power consumption that an operating frequency be as low as possible. In contrast, a high frequency is desirable for the bus interface and the interrupt circuit from the viewpoint of processing speed. Accordingly, a data path to a bus interface and an interrupt circuit and to an internal partial power supply interruption control circuit section is made an asynchronous data path, and a synchronizing circuit design is required.

One method that is well known as a synchronizing circuit that ensures an asynchronous data path is a method that provides multiple stages of flip-flops on a data receiving side (for example, see Atrenta, Inc. "Spyglass Clock-Reset Rules Reference Version 3.9.2" (pp. 98 to 114) January 2008 (hereafter, referred to as "Non-Patent Document 1"). However, according to the synchronizing circuit described in Non-Patent Document 1, there is the problem that the scale of the circuit on the receiving side increases. When this method is applied to a circuit for which it is desired to reduce an operating power such as an internal partial power supply interruption circuit section, there is the problem that since the circuit scale increases, a standby electric current increases.

Thus, conventionally, on an asynchronous data path from an internal partial power supply interruption circuit to an internal partial power supply interruption control circuit, there has been the problem that a control value can be rewritten by a fixed value of an isolation cell. Further, since the circuit scale of an internal partial power supply interruption control circuit increases when a synchronizing design is adopted for an asynchronous data path, there has been the problem that a standby electric current increases.

BRIEF SUMMARY OF THE INVENTION

According to one aspect of the present invention there can be provided a synchronizing circuit having a power-supplyinterruptible circuit section that can be subjected to a power supply interruption; a power supply interruption control circuit section configured to control the power supply interruption; and a gate circuit configured to output an output of the power-supply-interruptible circuit section as a fixed value when the power-supply-interruptible circuit section has been subjected to a power supply interruption; wherein: the power-supply-interruptible circuit section has a first data transmission register configured to output data for controlling the power supply interruption, and a clock enable control register configured to output a clock enable signal for performing control of a clock signal; and the power supply interruption control circuit section has a gated clock buffer configured to perform control of the clock signal based on the clock enable signal, and a first data reception register configured to take in the data that is output from the first data transmission register based on the clock signal that is controlled by the gated clock buffer.

BRIEF DESCRIPTION OF THE DRAWINGS

FIG. 11 is a block diagram that shows an example of the configuration of a synchronization detecting section 31a;

FIG. 12 is a timing chart that shows an example of operations of the synchronization detecting section 31a.

DETAILED DESCRIPTION OF THE INVENTION

Hereunder, embodiments of the present invention are described in detail with reference to the drawings.

First Embodiment

Figure 1:
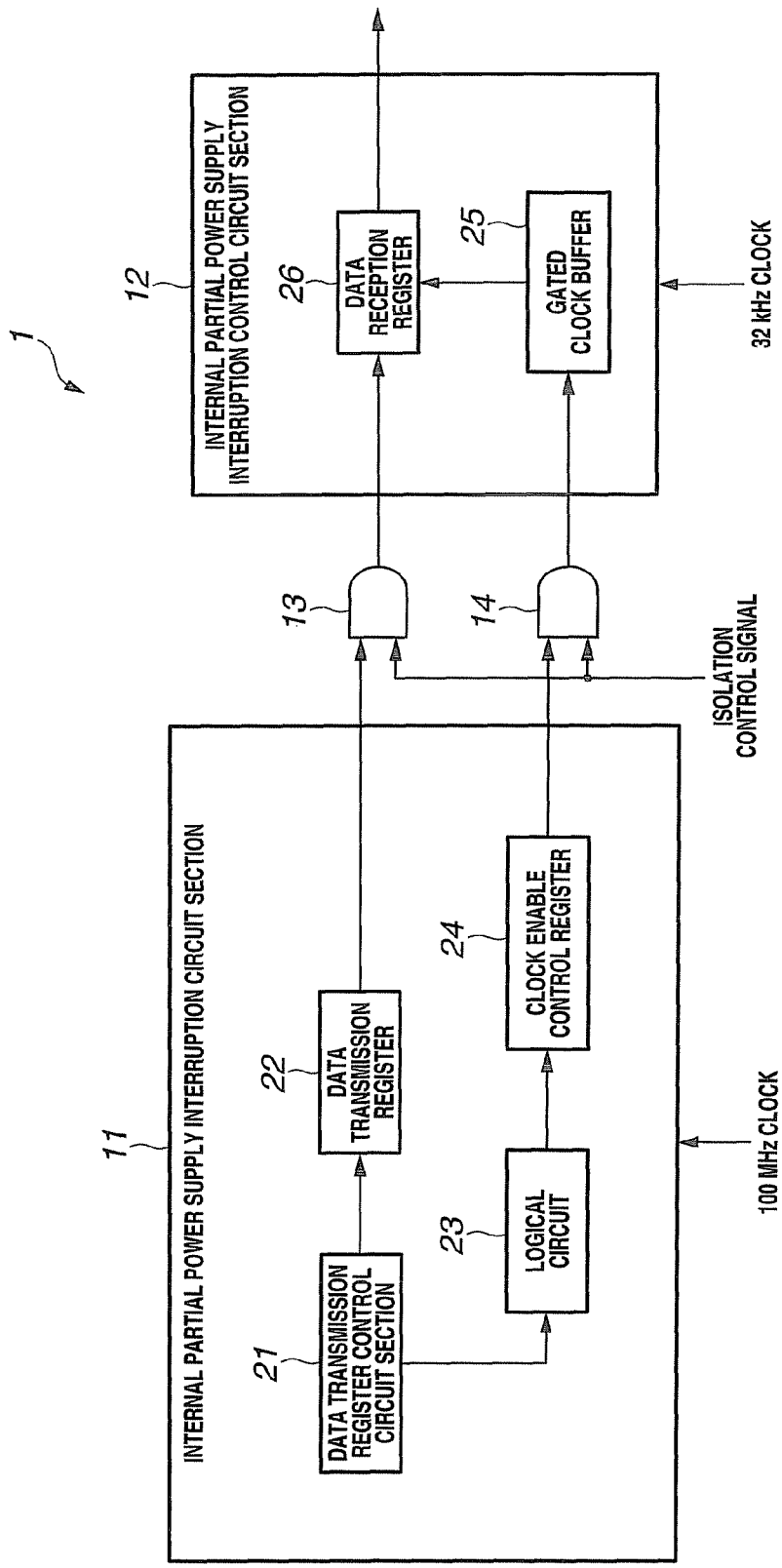
FIG. 1 is a block diagram that shows a configuration of a synchronizing circuit according to a first embodiment of the present invention.

First, the configuration of a synchronizing circuit according to a first embodiment of the present invention is described based on FIG. 1. FIG. 1 is a block diagram that shows the configuration of a synchronizing circuit according to the first embodiment of the present invention. As shown in FIG. 1, a synchronizing circuit 1 includes an internal partial power supply interruption circuit section 11 that is driven with a fast frequency such as 100 MHz, an internal partial power supply interruption control circuit section 12 that is driven with a slow frequency such as 32 kHz, and AND-type isolation cells 13 and 14 that are inserted in a signal wire between the internal partial power supply interruption circuit section 11 and the internal partial power supply interruption control circuit section 12.

The internal partial power supply interruption circuit section 11 is a power-supply-interruptible circuit section with power-gating circuit configured such that a power supply thereof can be interrupted, and includes a data transmission register control circuit section 21, a data transmission register 22, a logical circuit 23, and a clock enable control register 24. The internal partial power supply interruption circuit section 11 is a function block such as a bus interface that sends data for a power interruption, in other words, a control value for a power interruption to the internal partial power supply interruption control circuit section 12, or an interrupt circuit.

The internal partial power supply interruption control circuit section 12 is a power supply interruption control circuit section configured to control an interruption of a power supply to the internal partial power supply interruption circuit section 11, and includes a gated clock buffer 25 and a data reception register 26. The internal partial power supply interruption control circuit section 12 controls a power supply interruption of the internal partial power supply interruption circuit section 11 and an isolation control signal based on data for a power supply interruption from the internal partial power supply interruption circuit section 11. In this connection, although omitted from the drawings in order to facilitate the description, the internal partial power supply interruption control circuit section 12 performs power interruption control of one or more unshown internal partial power supply interruption circuits based on the data for a power supply interruption.

The data transmission register control circuit section 21 controls an update timing of data in the data transmission register 22 and, in a case of a data update, outputs an update control signal to the logical circuit 23.

At a rise of a 100 MHz clock signal, the data transmission register 22 takes in data and outputs the data that has been taken in to the isolation cell 13.

Upon receiving an update control signal, the logical circuit 23 outputs to the clock enable control register 24 a signal for controlling on/off of a 32 kHz clock signal according to a timing that prevents propagation of an undefined output between the data transmission register 22 and the data reception register 26.

The clock enable control register 24 takes in this signal at a rise of the 100 MHz clock signal, and outputs the taken-in signal as a clock enable signal to the isolation cell 14.

An isolation control signal is supplied to the isolation cells 13 and 14, respectively. The isolation control signal is "1" when the power of the internal partial power supply interruption circuit section 11 is on, and is "0" when the power of the internal partial power supply interruption circuit section 11 is off. More specifically, when the power of the internal partial power supply interruption circuit section 11 is on, the isolation cell 13 supplies an output of the data transmission register 22 to the data reception register 26, and when the power of the internal partial power supply interruption circuit section 11 is off, the isolation cell 13 supplies "0" to the data reception register 26. Similarly, when the power of the internal partial power supply interruption circuit section 11 is on, the isolation cell 14 supplies an output of the clock enable control register 24 to the gated clock buffer 25, and when the power of the internal partial power supply interruption circuit section 11 is off, the isolation cell 14 supplies "0" to the gated clock buffer 25. Thus, the isolation cells 13 and 14 are gate circuits that output the output of the internal partial power supply interruption circuit section 11 as a fixed value.

Based on the output of the isolation cell 14, the gated clock buffer 25 controls on/off of a 32 kHz clock signal, and supplies the controlled 32 kHz clock signal to the data reception register 26.

At a rise of the controlled 32 kHz clock signal, the data reception register 26 takes in an output of the isolation cell 13 and performs a data update.

As described above, based on the data update the internal partial power supply interruption control circuit section 12 performs control of the internal partial power supply interruption circuit section 11, or performs power interruption control of an unshown internal partial power supply interruption circuit, and control of an isolation control signal.

Next, operations of the embodiment configured in this manner are described.

First, a case is described in which power is being supplied to the internal partial power supply interruption circuit section 11. When updating of data, that is, a value, has occurred at the data transmission register 22, it is necessary to update also a value of the data reception register 26.

At the same time when the value of the data transmission register 22 is updated, an update control signal is supplied to the logical circuit 23. When a setup time and a hold time of the data reception register 26 can be satisfied, the logical circuit 23 turns the clock enable control register 24 "on" simultaneously upon updating of the value of the data transmission register 22. Thereafter, the logical circuit 23 turns the clock enable control register 24 "off" at a timing that satisfies the hold time of the data reception register 26.

However, since there is an asynchronous data path between the data transmission register 22 and the data reception register, when the setup time and the hold time of the data reception register 26 can not be satisfied, an undefined output arises at the data reception register 26. Therefore, at a timing at which the setup time and the hold time of the data reception register 26 can not be satisfied, the logical circuit 23 retains the clock enable control register 24 in an "off" state. Thereafter, at a timing at which an undefined output does not arise, that is, at a timing that satisfies a setup time of the data reception register 26, the logical circuit 23 turns the clock enable control register 24 "on". Further, at a timing that satisfies a hold time of the data reception register 26, the logical circuit 23 turns the clock enable control register 24 "off".

Figure 2:
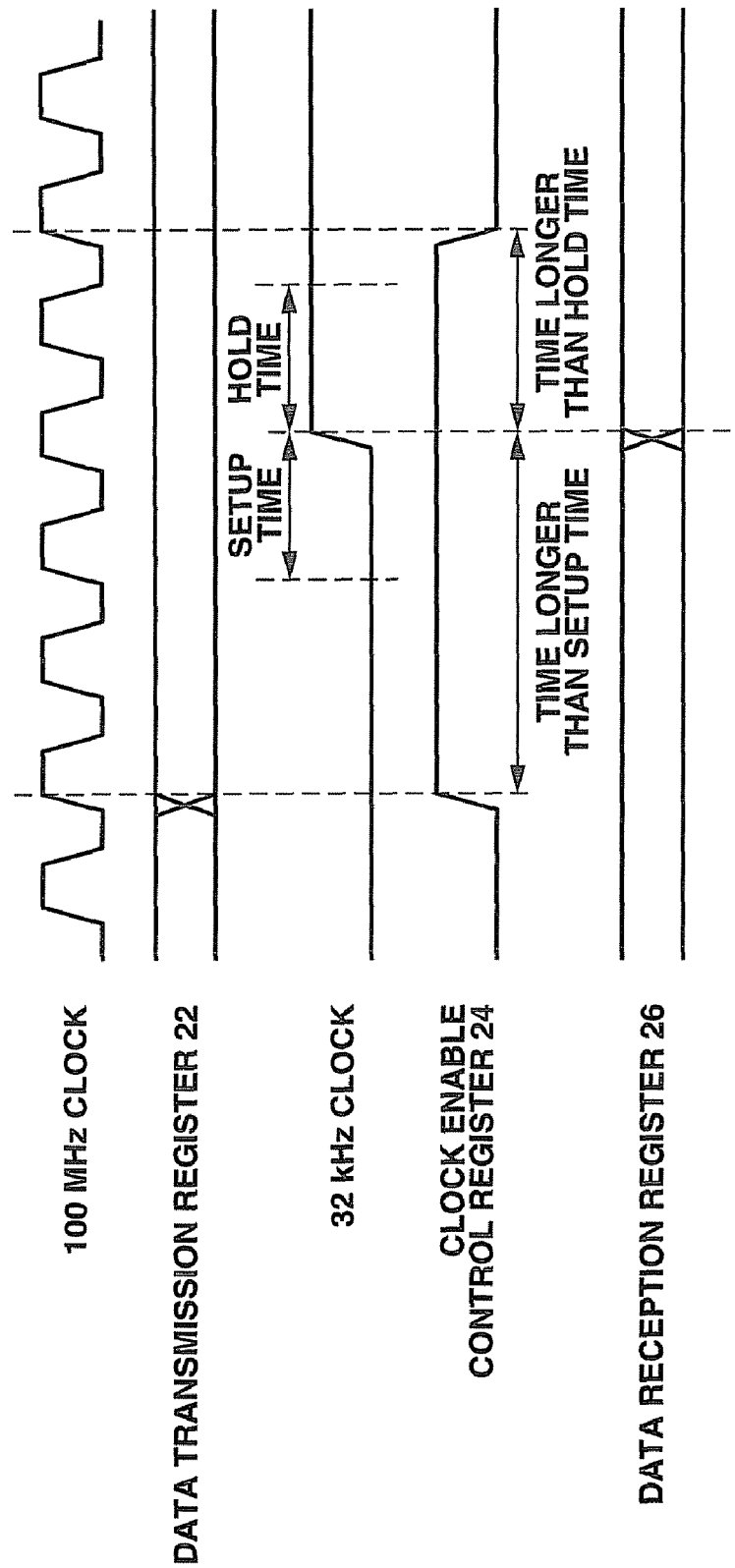
FIG. 2 is a timing chart that shows an example of operations of a synchronizing circuit 1 in a case that satisfies a setup time.

FIG. 2 is a timing chart that shows an example of operations of the synchronizing circuit 1 in a case that satisfies the setup time.

As shown in FIG. 2, when an update timing of the data transmission register 22 is longer than a setup time of the 32 kHz clock signal, the clock enable control register 24 is turned "on", i.e., set to "high" at the same time as a data update of the data transmission register 22. Thereafter, after the hold time of the 32 kHz clock signal lapses, the clock enable control register 24 is turned "off", i.e. set to "low". Thus, the data reception register 26 can take in a value that has been updated at the data transmission register 22 without an undefined output occurring.

Figure 3:
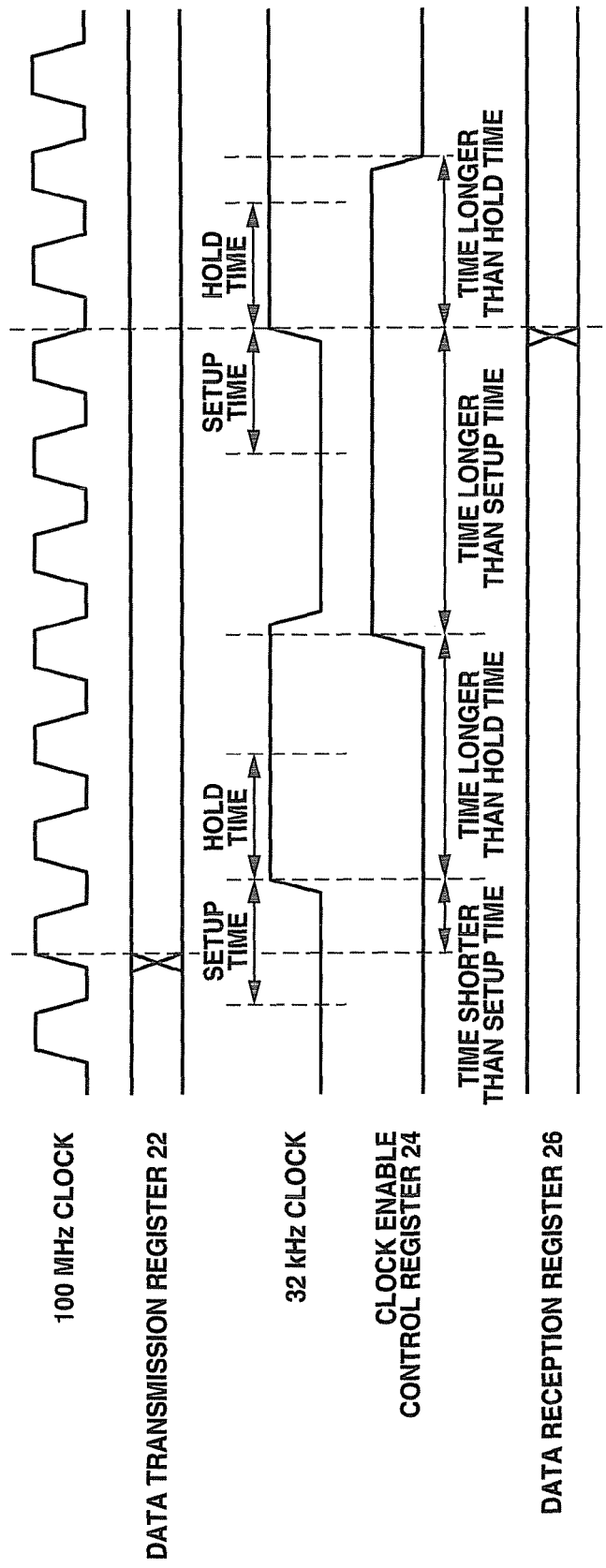
FIG. 3 is a timing chart that shows an example of operations of the synchronizing circuit 1 in a case that does not satisfy a setup time.

FIG. 3 is a timing chart that shows an example of operations of the synchronizing circuit 1 in a case that does not satisfy a setup time.

As shown in FIG. 3, when an update timing of the data transmission register 22 is shorter than a setup time of the 32 kHz clock signal, the clock enable control register 24 is retained in an "off" state even when data of the data transmission register 22 is updated. After a hold time of the 32 kHz clock signal elapses, the clock enable control register 24 is turned "on". Thereafter, after a next hold time of the 32 kHz clock signal elapses, the clock enable control register 24 is turned "off". Thus, the data reception register 26 can incorporate a value that has been updated at the data transmission register 22 without an undefined output occurring.

In contrast, a case will now be described in which power is supplied to the internal partial power supply interruption circuit section 11. At this time, the output of the clock enable control register 24 becomes undefined. However, since "0" is supplied as an isolation control signal to the isolation cell 14, an undefined output that is output from the clock enable control register 24 is fixed at "0", i.e. "off", by the isolation cell 14. In accompaniment therewith, the 32 kHz clock signal is stopped at the gated clock buffer 25. Although a value of the data transmission register 22 is also fixed at "0" by the isolation cell 13, because the 32 kHz clock signal of the data reception register 26 is stopped as described above, a case does not arise in which the value of the data reception register 26 is rewritten to "0".

A time when power is restored at the internal partial power supply interruption circuit section 11 will now be considered. Since the data transmission register 22 and the clock enable control register 24 of the internal partial power supply interruption circuit section 11 are reset at a time of power restoration, the data transmission register 22 is initialized to an initial value and the clock enable control register 24 is initialized to "off". Since the clock enable control register 24 is "on" only when the data transmission register 22 is updated, a case does not occur in which a value of the data reception register 26 is rewritten with an initial value of the data transmission register 22.

Thus, since the clock enable control register 24 is turned "on" only when updating the data transmission register 22, it is possible to prevent a malfunction caused by an unintended data update.

As described in the foregoing, the synchronizing circuit 1 can prevent a value of the data reception register 26 from being mistakenly rewritten by actions of the clock enable control register 24 and the isolation cell 14 on a control line. Further, since the circuit configuration of the internal partial power supply interruption control circuit section 12 can be realized with an extremely simple configuration, namely, the gated clock buffer 25 and the data reception register 26, a lower power consumption can be achieved for a standby power.

Hence, according to the synchronizing circuit 1 configured in this manner, rewriting of a control value by a fixed value of an isolation cell is prevented, and a standby electric current does not increase.

Figure 4:
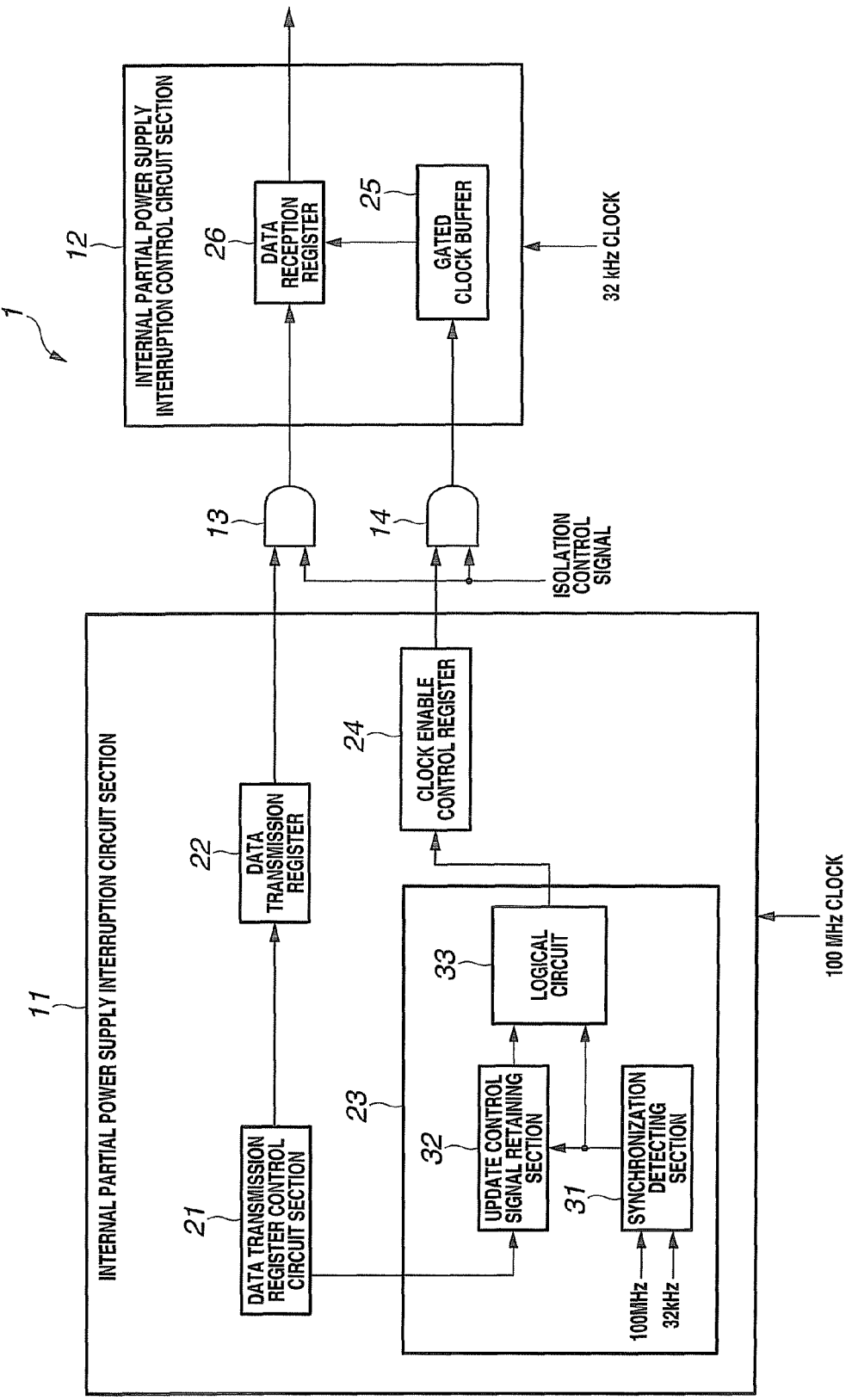
FIG. 4 is a block diagram that shows an example of the configuration of a logical circuit 23.

Next, a specific configuration of the logical circuit 23 that outputs a signal for controlling on/off of the 32 kHz clock signal to the clock enable control register 24 according to a timing that does not propagate an undefined output is described. FIG. 4 is a block diagram showing an example of the configuration of the logical circuit 23. As shown in FIG. 4, the logical circuit 23 has a synchronization detecting section 31, an update control signal retaining section 32, and a logical circuit 33 that toggles the clock enable control register 24 only when synchronization detection is enabled.

The synchronization detecting section 31 is supplied with a 32 kHz clock signal that is the same as that of the internal partial power supply interruption control circuit section 12, and a 100 MHz clock signal that is used at the internal partial power supply interruption circuit section 11. The synchronization detecting section 31 detects a synchronization enable interval based on the 32 kHz clock signal and the 100 MHz clock signal that are supplied, and outputs a synchronization enable interval signal. In this case, the term "synchronization enable interval" is defined as "an interval in which a setup time and a hold time of an FF (flip-flop) on the 32 kHz clock side can be ensured".

An update control signal that controls a timing for updating the data transmission register 22 and a synchronization enable interval signal from the synchronization detecting section 31 are input to the update control signal retaining section 32. The update control signal retaining section 32 has a function that retains an update control signal when the synchronization enable interval signal is disabled. In this connection, the update control signal may be any signal as long as it is a signal which can distinguish an update timing of the data transmission register 22. For example, the signal may be a write enable signal from an unshown bus, a gated clock enable signal for the data transmission register 22, or a comparison result between a value of a data input side and a value of a data output side of the data transmission register 22, that is, a signal that becomes "on" when a input side value and an output side value are different.

The logical circuit 33 outputs a signal that toggles the clock enable control register 24 to the clock enable control register 24 only when synchronization detection is enabled.

Figure 5:
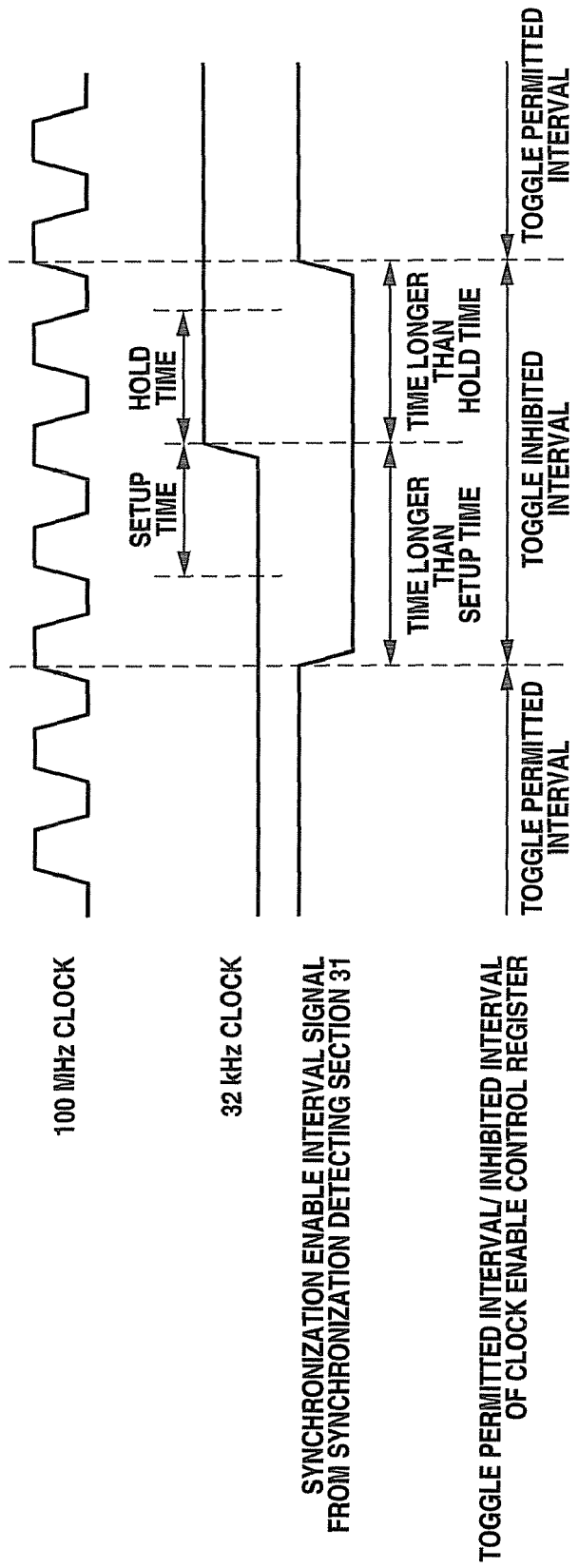
FIG. 5 is a timing chart that shows an example of operations of a synchronization detecting section 31.

FIG. 5 is a timing chart that shows an example of operations of the synchronization detecting section 31. In an interval in which a setup time and a hold time of the 32 kHz clock signal can not be ensured, the synchronization enable interval signal is "low", and synchronization detection is disabled. The interval in which synchronization detection is disabled ensures a time that is longer than the setup time and a time that is longer than the hold time, respectively. In an interval other than an interval in which the synchronization detection is disabled, the synchronization enable interval signal shifts to "high" to indicate that synchronization detection is enabled. The logical circuit 33 allows a toggle operation of the clock enable control register 24 only in a case in which the synchronization enable interval signal from the synchronization detecting section 31 is enabled. Thus, a setup time and a hold time on the 32 kHz clock side can be ensured.

Figure 6:
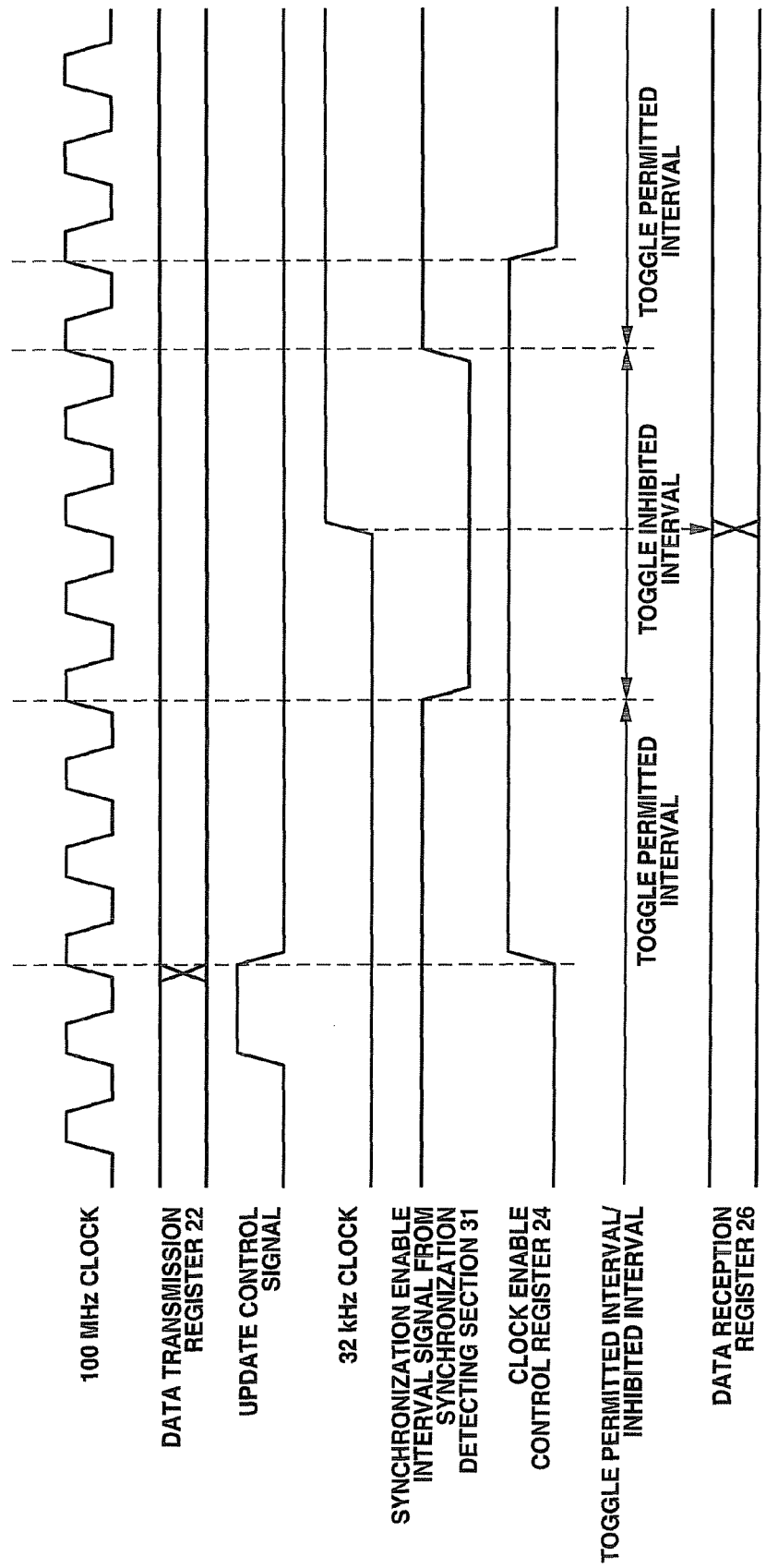
FIG. 6 is a timing chart that shows an example of operations in a case in which a synchronization enable interval is enabled at a time of data transfer.

FIG. 6 is a timing chart that shows an example of operations in a case in which a synchronization enable interval is enabled at a time of a data transfer. First, when the update control signal is enabled, a value of the data transmission register 22 is updated at a rise of the 100 MHz clock signal. At this time, since a synchronization enable interval from the synchronization detecting section 31 is enabled, the clock enable control register 24 is immediately turned "on". Subsequently, after the synchronization enable interval has become disabled, the value of the data reception register 26 is updated by the 32 kHz clock signal rising. By turning the clock enable control register 24 "off" after confirming that the synchronization enable interval has become enabled, the setup time and hold time of the 32 kHz clock signal are ensured. Because the data transmission register 22 and the clock enable control register 24 do not change while the synchronization enable interval is disabled, the data reception register 26 does not cause a setup time violation or a hold time violation.

Figure 7:
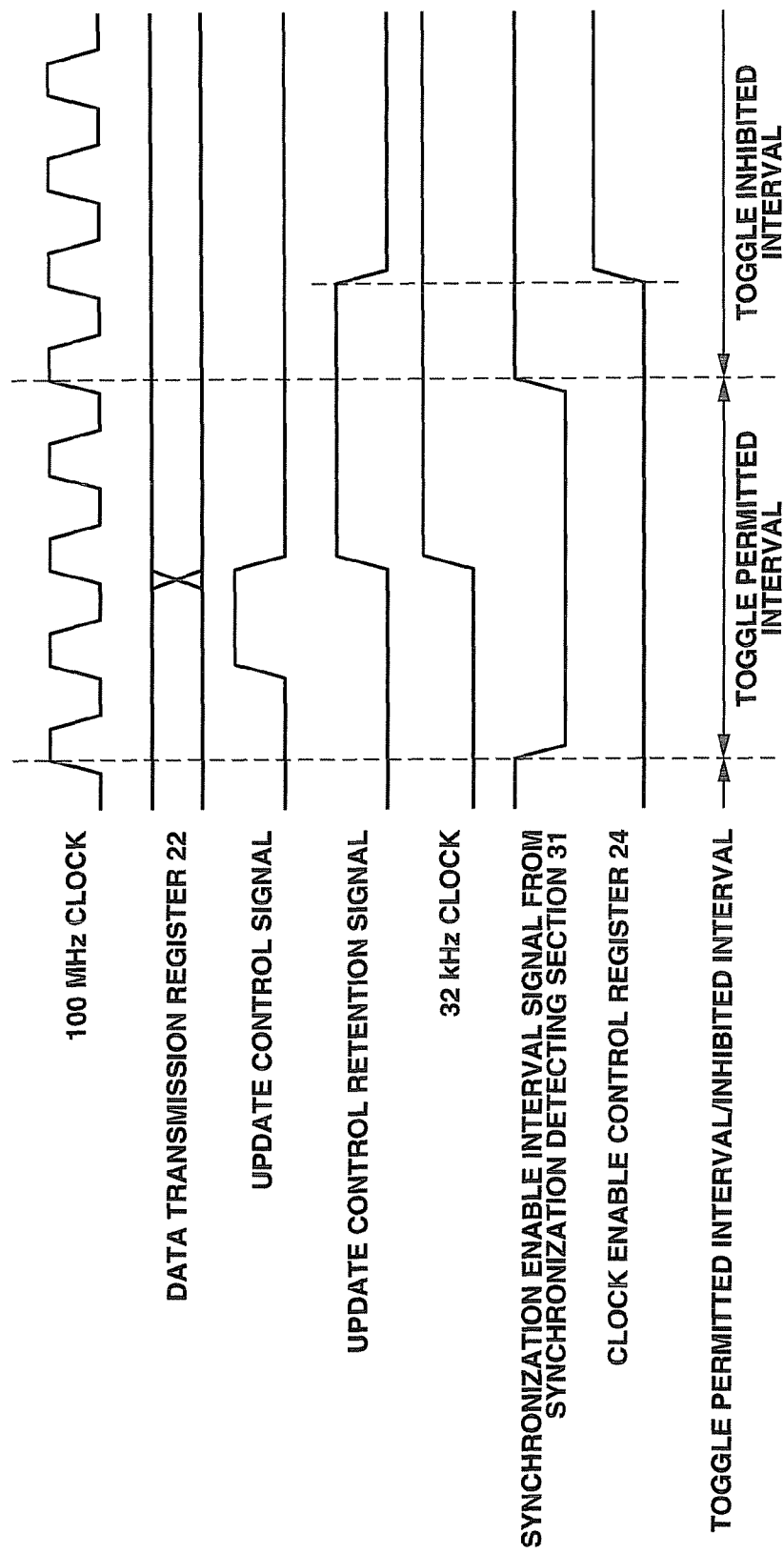
FIG. 7 is a timing chart that shows an example of operations in a case in which a synchronization enable interval is disabled at a time of data transfer.

FIG. 7 is a timing chart that shows an example of operations in a case in which a synchronization enable interval is disabled at a time of data transfer. First, when the update control signal is enabled, a value of the data transmission register 22 is updated at a rise of the 100 MHz clock signal. At this time, since a synchronization enable interval from the synchronization detecting section 31 is disabled, the clock enable control register 24 cannot be placed in an "on" state.

Therefore, an update flag is retained as an update control retention signal at the update control signal retaining section 32. At a time when the synchronization enable interval returns to an enabled state, if the update control retention signal is enabled the clock enable control register 24 is placed in an "on" state. Thus, by means of a function of the update control signal retaining section 32, it is possible to prevent information of an update flag being lost even when a synchronization enable interval is disabled. In this connection, although the data transmission register 22 is being updated at a timing when the synchronization enable interval is disabled, because the clock enable control register 24 is "off", a clock supply of the data reception register 26 is stopped. Consequently, a setup time violation and a hold time violation are not caused.

It is thereby possible to ensure a setup time and a hold time on the 32 kHz side by the function of the synchronization detecting section 31. Further, by means of a function of the update control signal retaining section 32, a data transfer is possible without loss of a data update and without causing a setup time violation or a hold time violation in a case in which synchronization detection is disabled.

As described above, the synchronizing circuit 1 can complete a data transfer between the data transmission register 22 and the data reception register 26 without losing data and without causing a setup time violation or a hold time violation.

Figure 8:
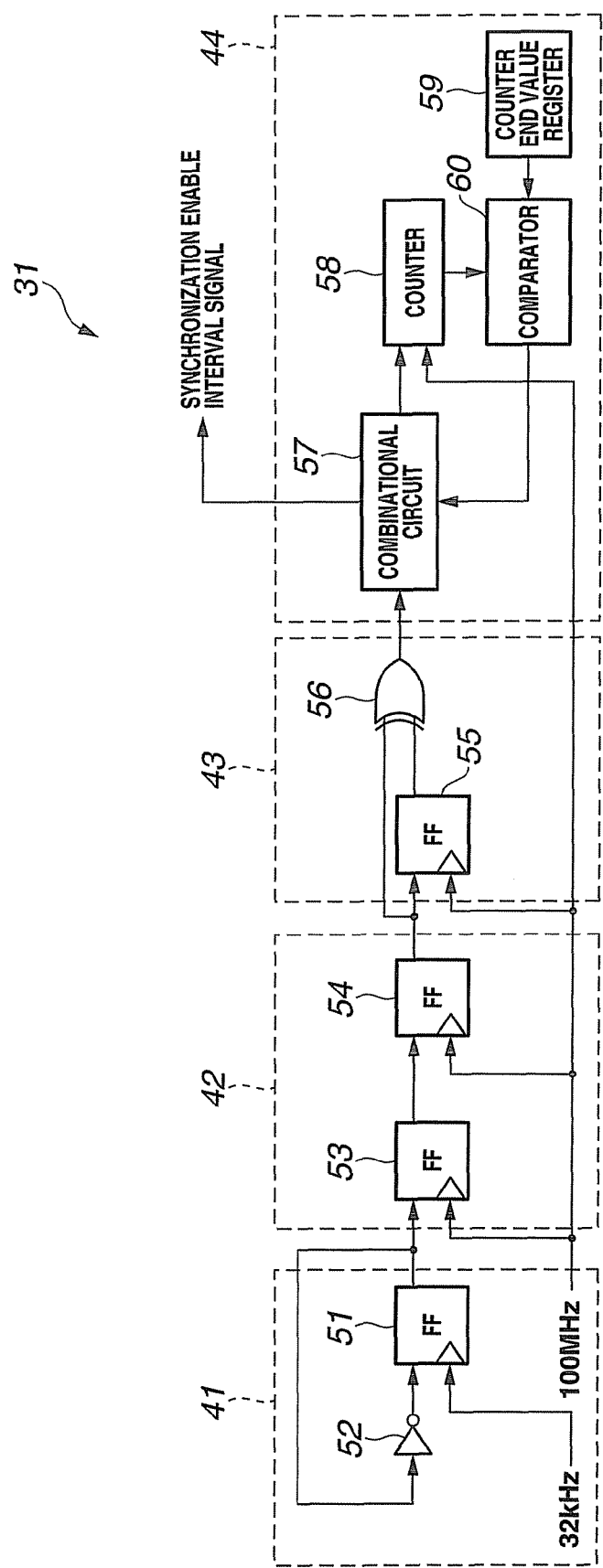
FIG. 8 is a block diagram that shows an example of the configuration of the synchronization detecting section 31.

Next, a specific configuration of the synchronization detecting section 31 configured to detect a synchronization enable interval and output a synchronization enable interval signal based on the 32 kHz clock signal and the 100 MHz clock signal is described. FIG. 8 is a block diagram that shows an example of the configuration of the synchronization detecting section 31. As shown in FIG. 8, the synchronization detecting section 31 has a 32 kHz toggle circuit 41, a synchronizing section 42 that utilizes a FF (flip-flop) at two stages, a 32 kHz edge detection circuit 43, and a 32 kHz-side setup time ensuring circuit 44.

The 32 kHz toggle circuit 41 includes an FF 51 and an inverter 52 as an inverting circuit. The synchronizing section 42 includes an FF 53 and an FF 54. The 32 kHz edge detection circuit 43 includes a FF 55 and an XOR circuit 56. The 32 kHz-side setup time ensuring circuit 44 includes a combinational circuit 57 as a synchronization detection circuit, a counter 58, a counter end value register 59 as a count end value retention section configured to retain a count end value, and a comparator 60 that performs a comparison between the counter 58 and the counter end value register 59. As described above, a synchronization enable interval signal is output as the output of the synchronization detecting section 31.

The 32 kHz toggle circuit 41 repeatedly toggles between "high" and "low" in synchrony with the 32 kHz clock signal, and outputs the toggle output to the synchronizing section 42. This is a measure to counter the fact that the 32 kHz clock signal is not used as an input at the synchronizing section 42 at a subsequent stage, and is employed because, usually, when a clock signal is used as an input, a problem arises that a clock tree synthesis can not be performed properly. The clock tree synthesis is technology that ensures synchronization between FFs by equalizing delays of clock lines from a root of a clock such as a PLL to a clock port of each FF by buffer insertion or the like.

The synchronizing section 42 has a design that synchronizes by means of FFs of a plurality of stages as is also described in the prior art. The synchronizing section 42 synchronizes 32 kHz "high" and "low" toggle outputs with a 100 MHz FF output and outputs the resulting signals. In this connection, although the synchronizing section 42 is configured by FFs 53 and 54 at two stages, the synchronizing section 42 may also be configured by FFs at three stages or more. More specifically, this is because, depending on a clock frequency or FF specifications, in some cases FFs are required at three stages or more.

The 32 kHz edge detection circuit 43 detects a 32 kHz rising edge by observing "high" and "low" toggle edges. More precisely, the 32 kHz edge detection circuit 43 detects an edge that is delayed by the number of FFs stages used in the synchronizing section 42. The delay according to the number of stages is utilized to ensure a hold time on the 32 kHz side.

The 32 kHz-side setup time ensuring circuit 44 is a circuit that starts a counter operation by taking a 32 kHz edge detection as a starting point, and stops the operation before the 32 kHz-side setup time. For example, when a 32 kHz clock cycle is divided by a 100 MHz clock cycle, the result is approximately 3125 cycles. Therefore, for example, by detecting a counter value 3114 using the counter 58 that takes an edge detection as a starting point, a position that is approximately 11 cycles before an edge of the 32 kHz clock signal can be known. As a result, the 32 kHz-side setup time can be ensured with the 32 kHz-side setup time ensuring circuit 44.

More specifically, when an edge is detected by the 32 kHz edge detection circuit 43, the combinational circuit 57 turns the synchronization enable interval signal "on" and also notifies the counter 58 that an edge is detected. Upon being notified that an edge is detected, the counter 58 counts the 100 MHz clock signal. A value that is counted, i.e. the count value, is supplied to the comparator 60. Further, a count end value from the counter end value register 59 is also supplied to the comparator 60. The comparator 60 compares the count value and the count end value. When the two values match, the comparator 60 notifies the combinational circuit 57 that the count value and the count end value match. In other words, the comparator 60 compares the count value and the count end value, and when the values match the comparator 60 outputs a match signal to the combinational circuit 57. Upon being notified by the comparator 60 that the count value and the count end value match, that is, when a match signal is output, the combinational circuit 57 turns the synchronization enable interval signal "off".

Figure 9:
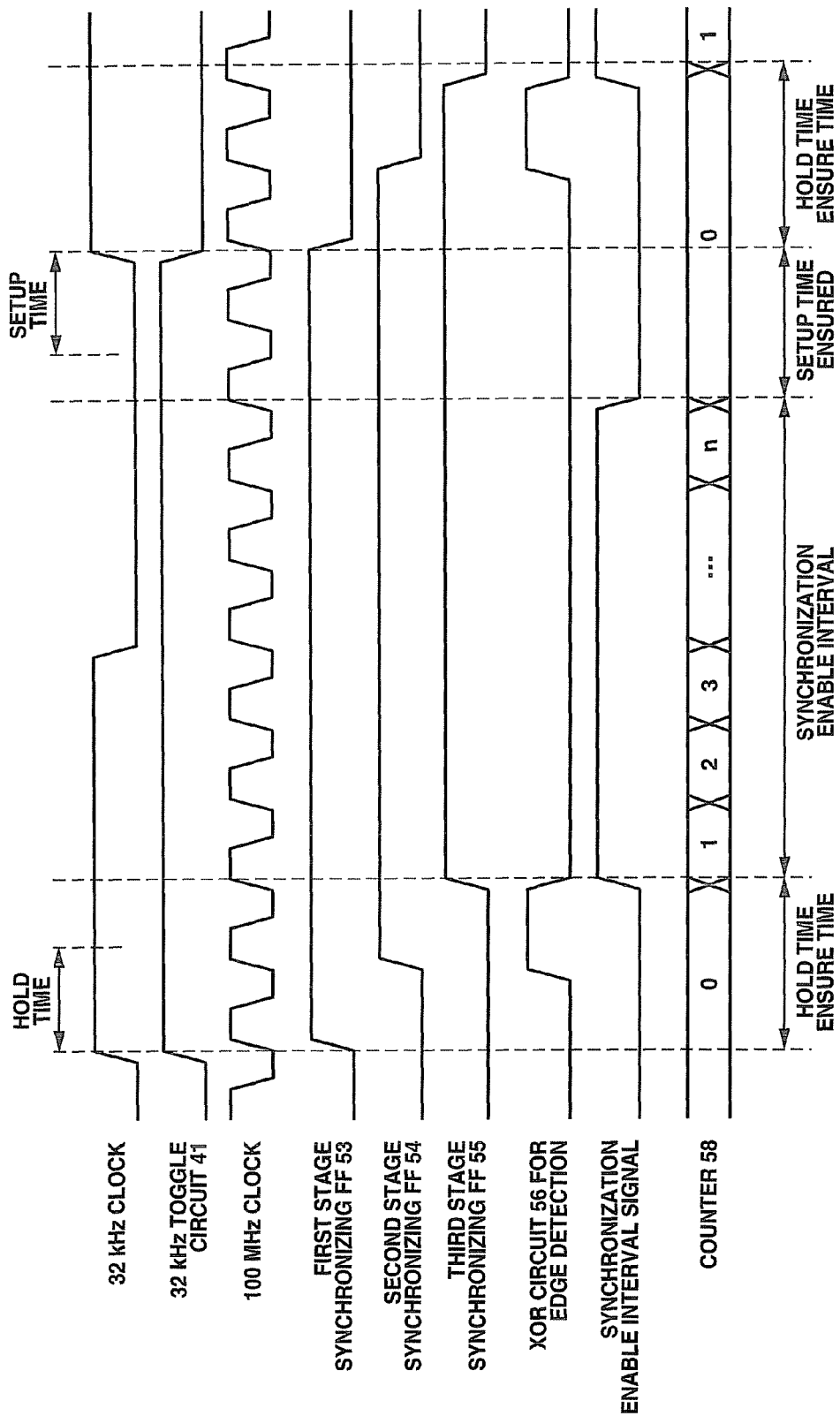
FIG. 9 is a timing chart that shows an example of operations of the synchronization detecting section 31.

FIG. 9 is a timing chart that shows an example of operations of the synchronization detecting section 31. As shown in FIG. 9, a toggle output of the 32 kHz clock signal from the 32 kHz toggle circuit 41 is synchronized by the FF 53 and FF 54 of the synchronizing section 42. Thereafter, a rising edge of the 32 kHz clock signal is detected by means of an output of the FF 55 and the XOR circuit 56 of the 32 kHz edge detection circuit 43. The XOR circuit 56 signal that is delayed by the amount of several stages of the 100 MHz clock signal is "high" and can secure a time that is adequate to ensure the hold time of the 32 kHz clock signal. In a case in which a time that is adequate to ensure the hold time of the 32 kHz clock signal can not be secured, it is necessary to increase the number of FF stages inside the synchronizing section 42 so that a time that is adequate to guarantee the hold time of the 32 kHz clock can be secured.

The synchronization enable interval signal shifts to "high" by taking an output of the XOR circuit 56 as a starting point. Simultaneously, a count of the 100 MHz clock signal is started by the counter 58. When a count value of the counter 58 reaches a count end value that is set in the counter end value register 59, the synchronization enable interval signal shifts to "low". A setting value of the counter end value register 59, that is, the count end value, is set so as to be sufficiently before a setup time of the 32 kHz clock signal. Thus, synchronization detection is enabled while the synchronization enable interval signal is "high".

As a feature of the synchronization detecting section 31 configured in this manner, the high degree of freedom with respect to an interval in which a setup time and a hold time are ensured may be mentioned. More specifically, in case of changing the timing of ensuring a setup time, it is necessary to rewrite a count end value of the counter end value register 59. Further, in case of changing the timing of ensuring a hold time, it is necessary to change the number of stages of FFs of the synchronizing section 42. Furthermore, even in a system in which a clock frequency to be synchronized is variable, since it is possible to overcome to the problem by merely rewriting a count end value of the counter end value register 59, the synchronization detecting section 31 can be applied to various places inside an LSI.

Second Embodiment

Figure 10:
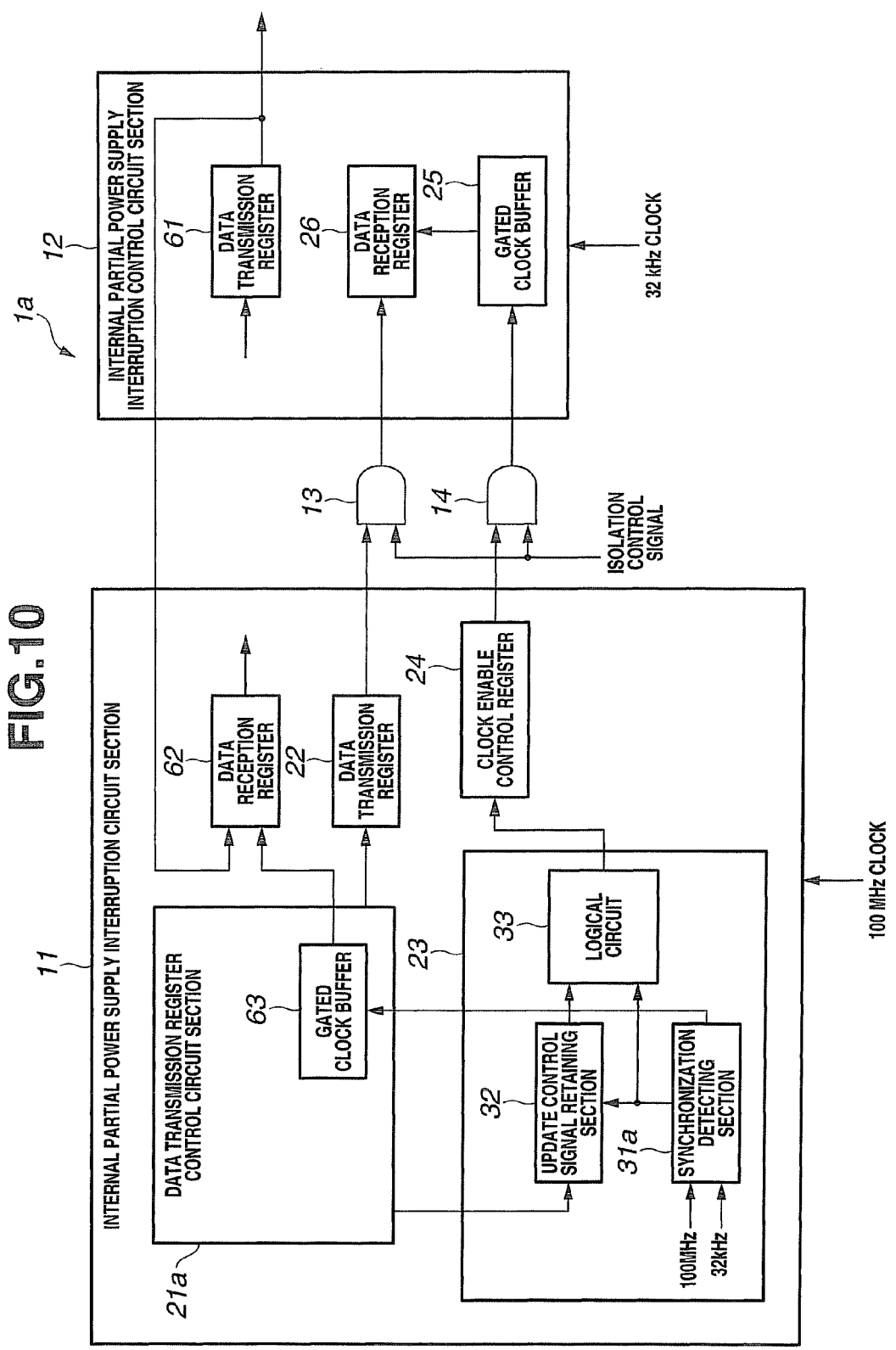
FIG. 10 is a block diagram that shows a configuration of a synchronizing circuit according to a second embodiment of the present invention.

Next, a second embodiment will be described. FIG. 10 is a block diagram that shows a configuration of a synchronizing circuit according to the second embodiment of the present invention. In this connection, components in FIG. 10 that are the same as those in FIG. 4 are denoted by the same reference numbers, and a description of those components is omitted hereunder.

According to the first embodiment, synchronizing of an asynchronous data path from the internal partial power supply interruption circuit section 11 to the internal partial power supply interruption control circuit section 12 was described. However, according to the present embodiment, synchronizing of an asynchronous data path from the internal partial power supply interruption control circuit section 12 to the internal partial power supply interruption circuit section 11 will be described.

As shown in FIG. 10, in addition to the components of the synchronizing circuit 1 of the first embodiment, a synchronizing circuit 1a of the present embodiment further includes a data transmission register 61 inside the internal partial power supply interruption control circuit section 12 and a data reception register 62 inside the internal partial power supply interruption circuit section 11. Further, instead of the data transmission register control circuit section 21 and the synchronization detecting section 31 of the first embodiment, the synchronizing circuit 1a of the present embodiment includes a data transmission register control circuit section 21a and a synchronization detecting section 31a, respectively.

The data transmission register control circuit section 21a includes a gated clock buffer 63. The synchronization detecting section 31a outputs a synchronization enable interval start signal to the gated clock buffer 63. The configuration of the synchronization detecting section 31a is described in detail later using FIG. 11.

The gated clock buffer 63 controls a 100 MHz clock signal for the data reception register 62 based on the synchronization enable interval start signal. The data reception register 62 takes in data from the data transmission register 61 to perform a data update at a rise of the 100 MHz clock signal that is controlled by the gated clock buffer 63.

Figure 11:
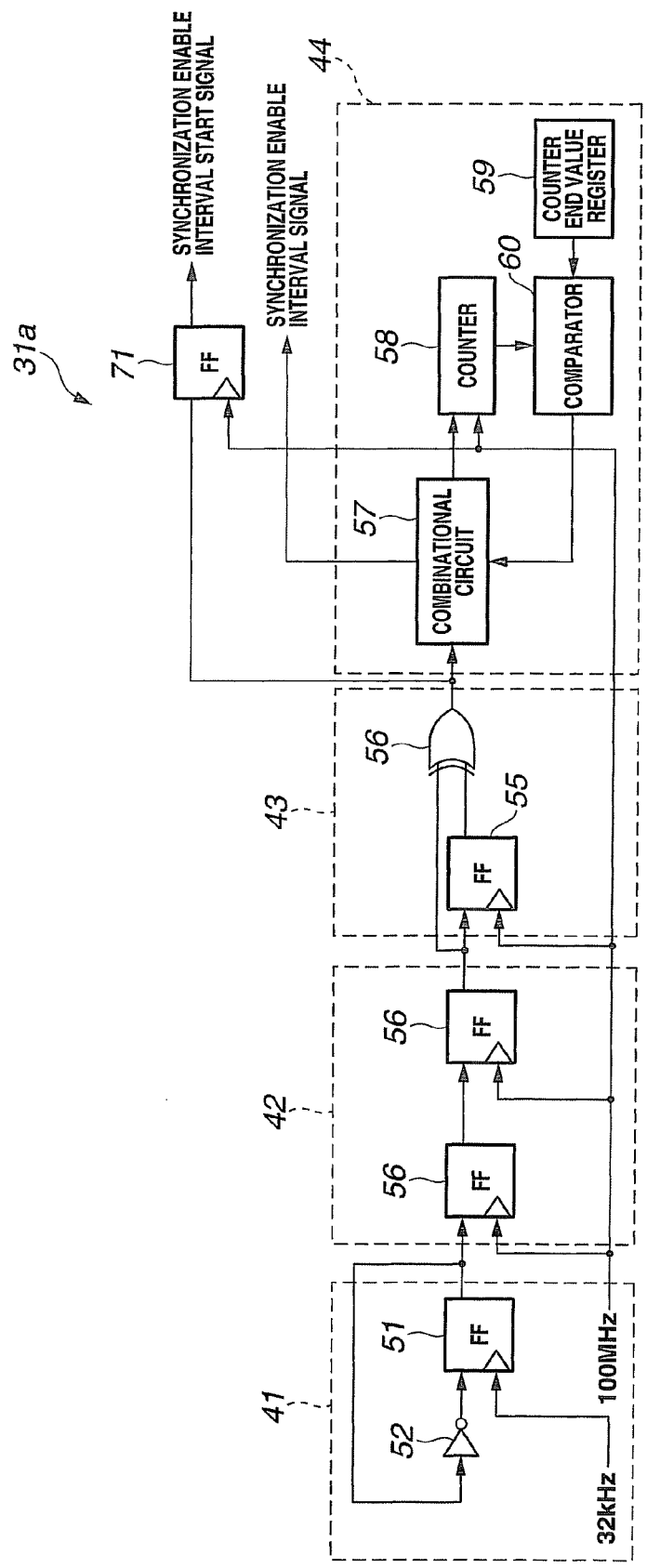

FIG. 11 is a block diagram that shows an example of the configuration of the synchronization detecting section 31a. In this connection, components in FIG. 11 that are the same as those in FIG. 8 are denoted by the same reference numerals, and a description of those components is omitted below.

As shown in FIG. 11, the synchronization detecting section 31a of the present embodiment includes an FF 71 in addition to the components of the synchronization detecting section 31 of the first embodiment. The FF 71 takes in an output of the XOR circuit 56 of the 32 kHz edge detection circuit 43 at a rise of the 100 MHz clock signal, and outputs the output that has been taken in as a synchronization enable interval start signal to the gated clock buffer 63 as described above.

Figure 12:
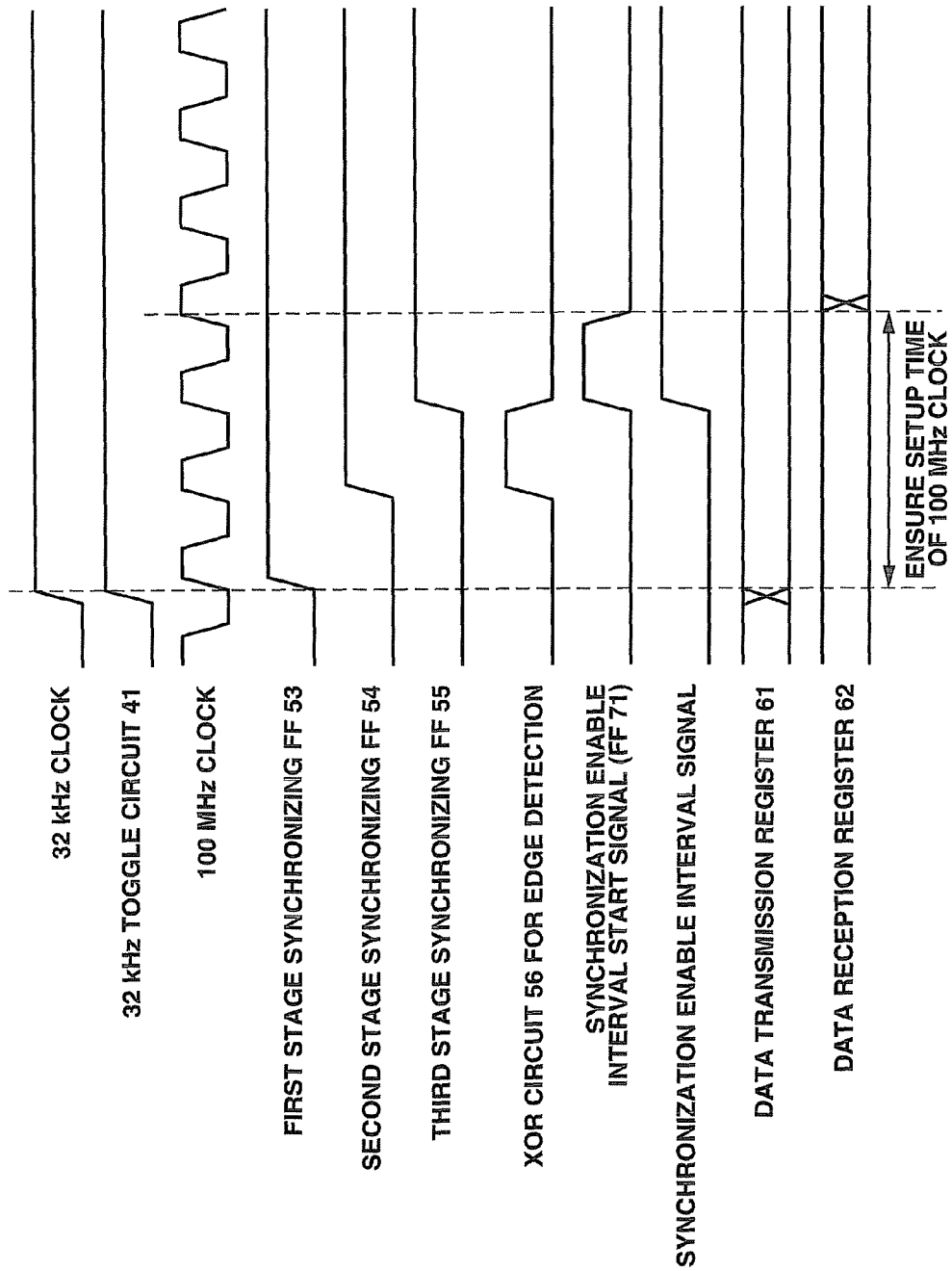

FIG. 12 is a timing chart that illustrates an example of operations of the synchronization detecting section 31a.

The synchronization enable interval start signal is a pulse signal of the amount of one clock of the 100 MHz clock signal. The data transmission register 61 is updated in synchrony with the 32 kHz clock signal. The data reception register 62 is updated in synchrony with the 100 MHz clock signal when the synchronization enable interval start signal is "high" (1502). The synchronization enable interval start signal is adequately delayed with respect to the 32 kHz clock signal. In FIG. 12, since that is a delay of the amount of three clocks of the 100 MHz clock signal, a setup time of the data transmission register 61 can be satisfied (1503). The hold time represents no problem whatsoever because the hold time is not updated at a timing when the synchronization enable interval start signal is "high". Hence, the synchronizing circuit 1a is a synchronizing circuit that can ensure an asynchronous data transfer from the internal partial power supply interruption control circuit section 12 to the internal partial power supply interruption circuit section 11.

Thus, by merely adding a single FF 71 to the synchronization detecting section 31a, it is possible to realize a synchronizing circuit that can ensure an asynchronous data transfer from the internal partial power supply interruption control circuit section 12 to the internal partial power supply interruption circuit section 11.

Third Embodiment

Figure 13:
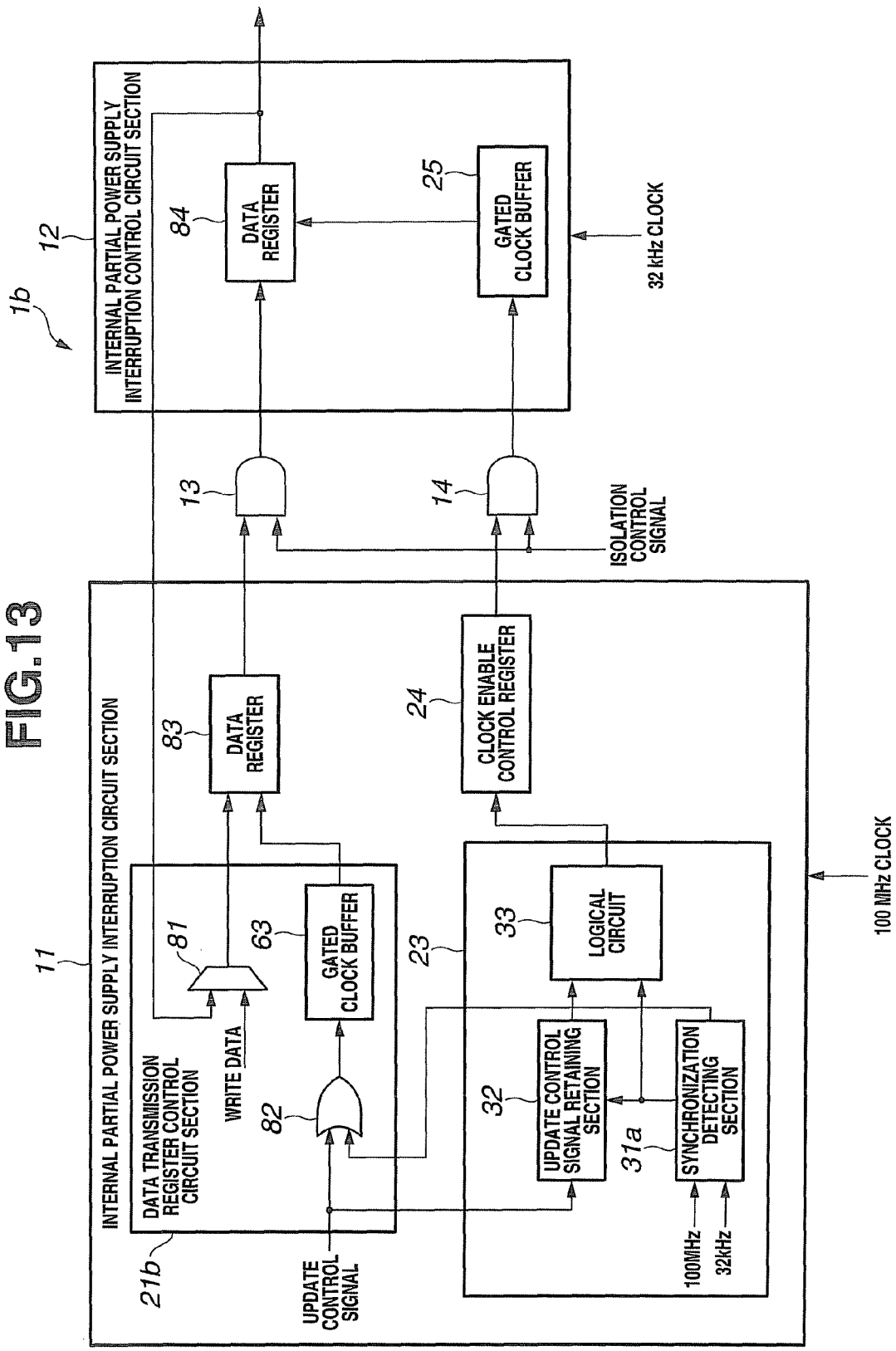
FIG. 13 is a block diagram that shows a configuration of a synchronizing circuit according to a third embodiment of the present invention.

Next, a third embodiment is described. FIG. 13 is a block diagram that illustrates the configuration of a synchronizing circuit according to the third embodiment of the present invention. In this connection, components in FIG. 13 that are the same as those in FIG. 10 are denoted by the same reference numbers, and a description of those components is omitted hereunder. A synchronizing circuit 1b of the third embodiment is a synchronizing circuit that ensures bidirectional asynchronous data transfers between the internal partial power supply interruption circuit section 11 and the internal partial power supply interruption control circuit section 12.

As shown in FIG. 13, the synchronizing circuit 1b of the present embodiment is configured using a data transmission register control circuit section 21b instead of the data transmission register control circuit section 21a of the synchronizing circuit 1a of the second embodiment. Further, the synchronizing circuit 1b of the third embodiment is configured using a data register 83 for sending and receiving that is driven by a 100 MHz clock signal instead of the data transmission register 22 and the data reception register 62 of the synchronizing circuit 1a of the second embodiment, and using a data register 84 for sending and receiving that is driven by a 32 kHz clock signal instead of the data reception register 26 and the data transmission register 61 of the synchronizing circuit 1a of the second embodiment.

The data transmission register control circuit section 21b includes a multiplexer 81 and an OR circuit 82 in addition to the components of the data transmission register control circuit section 21a of the synchronizing circuit 1a of the second embodiment.

Updating of data of the data register 83 will now be described. In this connection, since updating of data of the data register 84 is performed in the same manner as in the first embodiment, a description thereof is omitted here.

The multiplexer 81 of the data transmission register control circuit section 21b is supplied with write data from a normal write data path and feedback data from the data register 84 inside the internal partial power supply interruption control circuit section 12. The multiplexer 81 performs switching between writing of normal write data and writing of feedback data from the data register 84. The multiplexer 81 selects write data when the update control signal is enabled and selects feedback data when the synchronization enable interval start signal is enabled, and outputs the selected write data or feedback data to the data register 83.

The update control signal and the synchronization enable interval start signal from the synchronization detecting section 31a are input into the OR circuit 82. The OR circuit 82 outputs a logical sum of the update control signal and the synchronization enable interval start signal to the gated clock buffer 63. Based on the logical sum output, the gated clock buffer 63 controls the 100 MHz clock signal and outputs the controlled 100 MHz clock signal to the data register 83.

Based on the 100 MHz clock signal that is controlled by the gated clock buffer 63, the data register 83 takes in write data or feedback data from the multiplexer 81 to perform a data update.

The timing of the data update is the same as that described in the first and second embodiments. In this connection, regarding a case in which the update control signal and the synchronization enable interval start signal are concurrently enabled, since the data to which priority is to be given will differ according to the functions or design policy, the data to which priority is to be given in such a case is not defined here.

As described above, the synchronizing circuit 1b of the third embodiment can realize a synchronizing circuit that ensures bidirectional asynchronous data transfers.

The present invention is not limited to the above described embodiments, and various changes and modifications may be made without departing from the spirit and scope of the present invention.

What is claimed is:
1. A synchronizing circuit, comprising:
a power-supply-interruptible circuit section that can be subjected to a power supply interruption;
a power supply interruption control circuit section configured to control the power supply interruption; and
a gate circuit configured to output an output from the power-supply-interruptible circuit section as a fixed value when the power-supply-interruptible circuit section has been subjected to a power supply interruption;
wherein:
the power-supply-interruptible circuit section has a first data transmission register configured to output data for controlling the power supply interruption, and a clock enable control register configured to output a clock enable signal for performing control of a clock signal; and
the power supply interruption control circuit section has a gated clock buffer configured to perform control of the clock signal based on the clock enable signal, and a first data reception register configured to take in the data that is output from the first data transmission register based on the clock signal that is controlled by the gated clock buffer.

2. The synchronizing circuit according to claim 1, wherein:
the power-supply-interruptible circuit section operates with a first clock signal of a predetermined frequency, and the power supply interruption control circuit section operates with a second clock signal of a frequency that is lower than the predetermined frequency; and
the power-supply-interruptible circuit section comprises:
a synchronization detecting section configured to perform synchronization detection by generating a synchronization enable interval signal that ensures a setup time and a hold time in the power supply interruption control circuit section based on the first and the second clock signals;
an update control signal retaining section configured to, in a case in which updating of the data has occurred in the first data transmission register in an interval in which the synchronization detection is disabled, retain an update control signal indicating that updating of the data has occurred until the synchronization detection becomes enabled; and
a logical circuit configured to output to the clock enable control register a toggle permitting signal that permits toggling of the clock enable signal only when the synchronization detection is enabled.

3. The synchronizing circuit according to claim 2, wherein the synchronization detecting section comprises:
a toggle circuit configured to output a toggle signal that toggles in synchrony with the second clock signal;
a synchronizing section configured to synchronize the toggle signal by means of flip-flops of a plurality of stages that operate with the first clock signal, and output the resulting signal;
an edge detection circuit configured to detect an edge of the toggle signal by taking in an output of the synchronizing section according to the first clock signal; and
a setup time ensuring circuit configured to ensure a setup time on the power supply interruption control circuit section side by enabling the synchronization detection by taking a detection of an edge of the edge detection circuit as a starting point, counting the first clock signal taking detection of the edge as a starting point, and disabling the synchronization detection when the value that is counted reaches a count end value.

4. The synchronizing circuit according to claim 3, wherein:
the power supply interruption control circuit section comprises a second data transmission register;
the power-supply-interruptible circuit section comprises a second data reception register configured to receive data from the second data transmission register;
the synchronization detecting section is configured to generate a synchronization enable interval start signal that is enabled for only an amount of one clock of the first clock signal, when the synchronization detection is enabled; and
in a case in which the synchronization enable interval start signal is enabled, the second data reception register receives the data from the second data transmission register.

5. The synchronizing circuit according to claim 4,
wherein the first data transmission register and the second data reception register are a first data register configured to be used by switching between sending and receiving, and the first data reception register and the second data transmission register are a second data register configured to be used by switching between sending and receiving;
wherein the synchronizing circuit further comprises a selecting section configured to select the data from the second data register when the synchronization enable interval start signal is enabled, and to select write data and output the selected write data to the first data register when the update control signal is enabled; and
wherein the first data register takes in an output from the selecting section based on the first clock signal that is controlled by an output of a logical sum of the synchronization enable interval start signal and the update control signal.

6. The synchronizing circuit according to claim 1,
wherein the power-supply-interruptible circuit section is provided in a plurality; and
wherein the power supply interruption control circuit section controls the power interruption with respect to the plurality of power-supply-interruptible circuit sections.

7. The synchronizing circuit according to claim 2,
further comprising a data transmission register control circuit section configured to control a timing of updating the data in the first data transmission register and also output the update control signal to an update control signal retaining section.

8. The synchronizing circuit according to claim 3,
wherein the toggle circuit comprises a flip-flop that takes in an input value with the second clock signal and outputs the input value that is taken in, and an inverting circuit that inverts an output value that the flip-flop outputs and supplies the inverted output value to the flip-flop as the input value.

9. The synchronizing circuit according to claim 8,
wherein the inverting circuit is an inverter.

10. The synchronizing circuit according to claim 3,
wherein the setup time ensuring circuit comprises a count end value retention section configured to retain the count end value.

11. The synchronizing circuit according to claim 10,
further comprising a counter configured to count the first clock signal by taking a detection of the edge as a starting point.

12. The synchronizing circuit according to claim 11,
further comprising a comparator configured to compare a count value of the first clock signal that is counted by the counter and the count end value that is supplied from the count end value retention section.

13. The synchronizing circuit according to claim 12,
wherein the comparator compares the count value and the count end value, and outputs a match signal when the count value and the count end value match.

14. The synchronizing circuit according to claim 13,
further comprising a synchronization detection circuit configured to enable the synchronization detection by taking a detection of an edge of the edge detection circuit as a starting point, and to disable the synchronization detection upon output of the match signal from the comparator.

* * * * *